United States Patent [19]

Hütter

[11] Patent Number: 4,627,630
[45] Date of Patent: Dec. 9, 1986

[54] CHAIN LINK RUNNER ASSEMBLY

[76] Inventor: Hans-Georg Hütter, Beckgasse 46, A 1130 Vienna, Austria

[21] Appl. No.: 654,777

[22] Filed: Sep. 26, 1984

[30] Foreign Application Priority Data

Sep. 27, 1983 [EP] European Pat. Off. ........ 83890170.0

[51] Int. Cl.⁴ ............................................. B62D 57/00
[52] U.S. Cl. ............................ 280/28.5; 280/11.1 ET;
                                                    305/18; 305/52
[58] Field of Search .......... 280/28.5, 11.1 R, 11.1 BT,
       280/11.1 ET; 305/18, 39, 52, 60; 198/838, 845

[56]                References Cited
              U.S. PATENT DOCUMENTS

| 145,771   | 12/1873 | Wheeler | 198/845      |
| 1,390,324 | 9/1921  | Worth   | 305/52       |
| 2,309,603 | 1/1943  | Köhn    | 305/18       |
| 4,440,408 | 4/1984  | Velman  | 280/11.1 ET  |

FOREIGN PATENT DOCUMENTS

| 397668  | 2/1923  | Fed. Rep. of Germany ..... 280/11.1 ET |
| 2651670 | 5/1978  | Fed. Rep. of Germany ..... 280/11.1 ET |
| 503196  | 6/1920  | France .................................. 305/18 |
| 435080  | 10/1967 | Switzerland ................ 280/11.1 ET |
| 542717  | 1/1942  | United Kingdom .................. 305/18 |

Primary Examiner—John J. Love
Assistant Examiner—Charles R. Watts
Attorney, Agent, or Firm—Abelman Frayne Rezac & Schwab

[57]                ABSTRACT

A runner assembly consists of a hollow support providing a track, and a chain link belt revolving in the track, the hollow support consisting of a pair of frame members contoured in mirror symmetry, and which are joined together to provide flanges facing towards each other. The chain link belt is thus guided, and is at least partially encapsulated and protected against contaminants.

11 Claims, 15 Drawing Figures

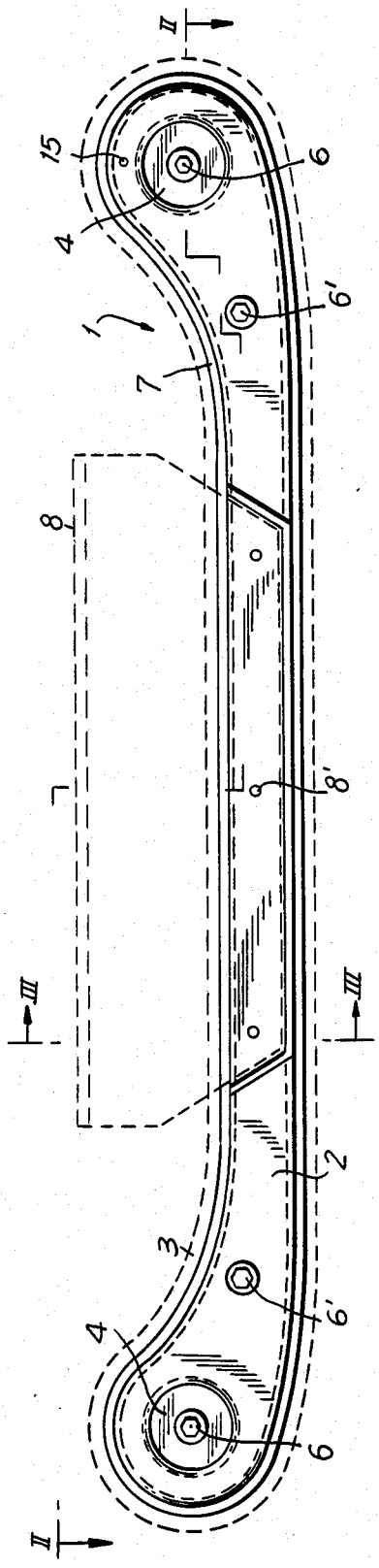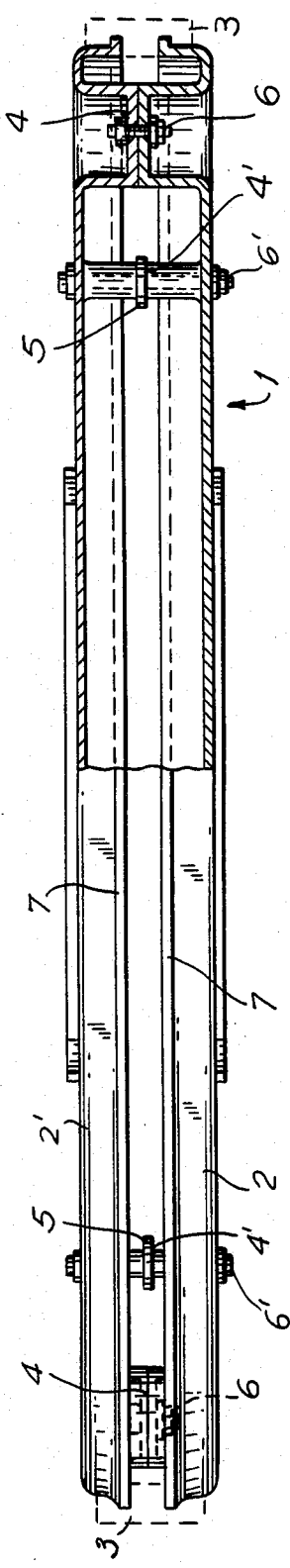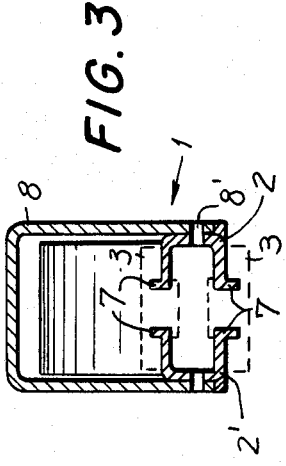

FIG. 4
FIG. 5
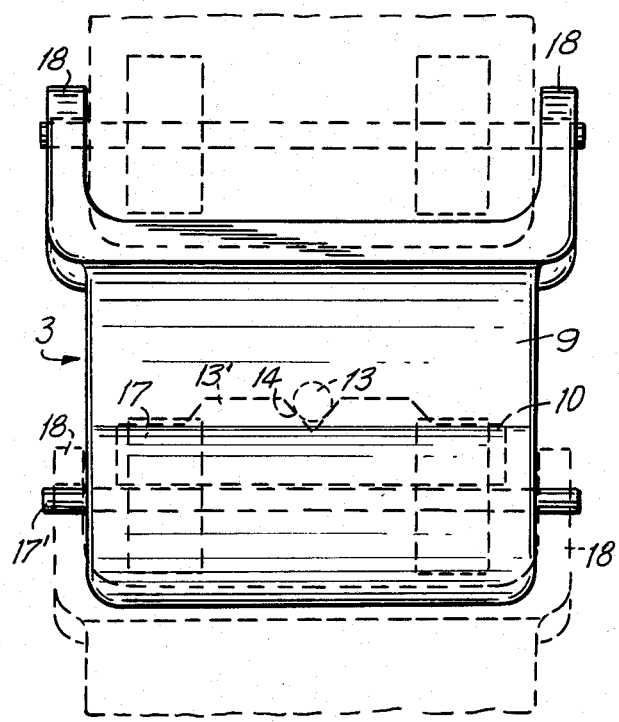
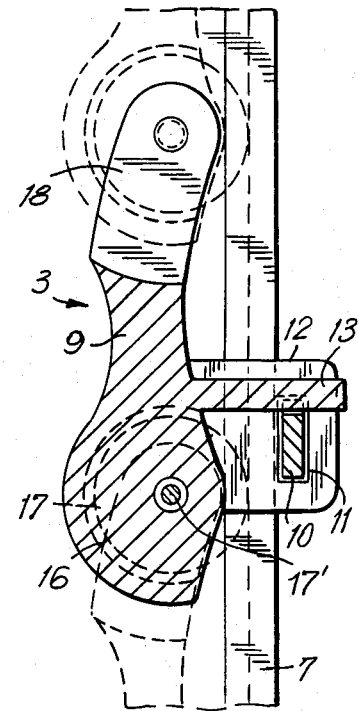
FIG. 6
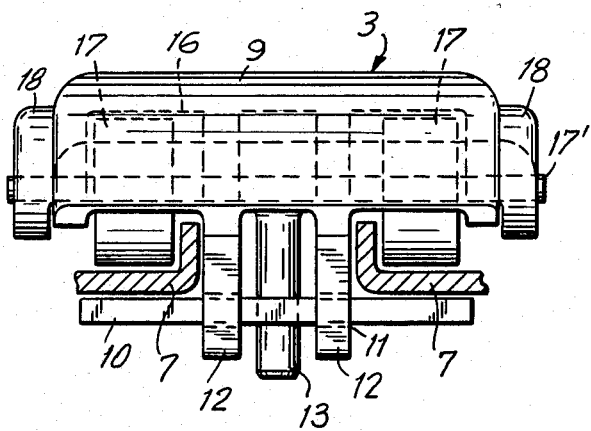
FIG. 7
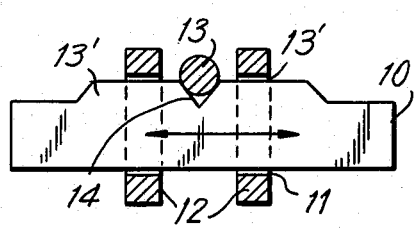

CHAIN LINK RUNNER ASSEMBLY

FIELD OF THE INVENTION

The invention relates to a chain link runner assembly for the support of a platform of the like, the runner assembly being an especially compact and sturdy unit, in which movable components of the link belt are protected against impact, shock, wear and contamination by dirt, while being easily interchangeable and, if necessary, replaceable. Preferably, the entire runner assembly is formed from a corrosion-free and light-weight material, in particular a plastics material.

THE INVENTIVE CONCEPT

According to the most important feature of the invention, the runner assembly consists of a hollow frame providing a continuous peripheral track, and a chain link belt movable along that track.

Retainers for the chain links of the link belt are located inside the hollow suport and are thus protected against stresses and contamination by dirt and debris. The rolling resistance of chain link belts is extremely low, and the pressure exerted by such chains is advantageously low due to the weight distribution over a large area, thus reducing the danger of sinking into soft ground.

According to the invention, the hollow support frame consists of a pair of frame members which are contoured in mirror symmetry, and which are joined together in back to back relationship to provide a hollow box section having continuous peripheral flanges facing each other and which provide a guide for the link belt.

With this form of the hollow support frame, high rigidity can be obtained with comparatively little material. Also the manufacture of the hollow support frame is greatly simplified, and the cost thereof reduced to a minimum.

As load carrier for a payload, a U-sectioned load carrier is provided, the legs of which are attached to opposite sides of the hollow support frame.

The runner assembly according to the invention is suitable for a multitude of applications. For example, it can be made use of as a sled, as a sports equipment, or a toy, the main advantage being that the runner assembly is a self-enclosed unit arranged in such a way that only the tread surfaces of the links of the link belt are exposed.

DESCRIPTION OF THE DRAWINGS

The invention in its several preferred embodiments is now described with reference to the accompanying drawings, in which:

FIG. 1 is a side view of the runner assembly;

FIG. 2 is partly a plan view and partly a horizontal section section along line II—II of FIG. 1;

FIG. 3 is a transverse section along line III—III if FIG. 1;

FIGS. 4 to 6 show an individual link of the linkbelt in plan view, in longitudinal section and in an end view, respectively;

FIG. 7 shows a detail of such a link in a section along the line VII—VII of FIG. 6;

DESCRIPTION OF THE PREFERRED EMBODIMENTS

Figure 8:
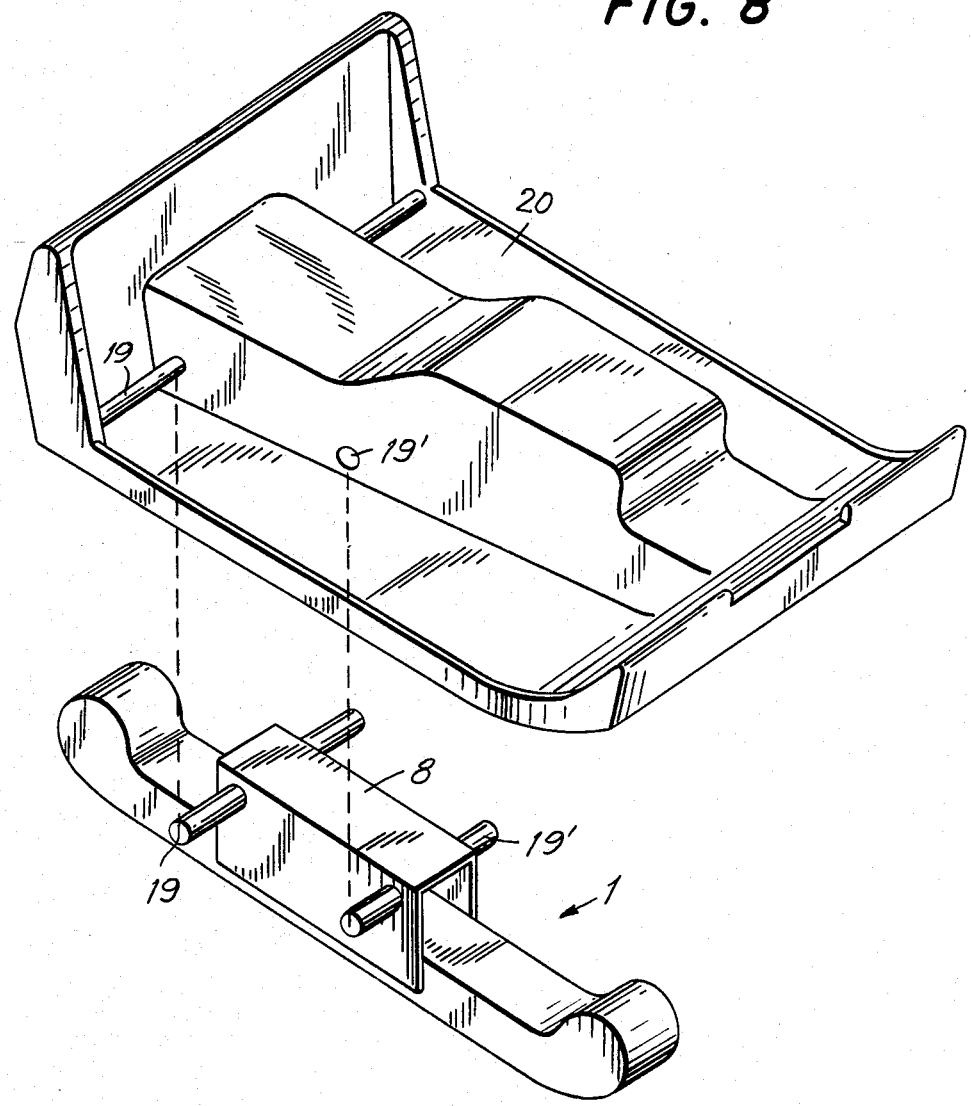
FIGS. 8 and 9 show in perspective and in a schematic longitudinal section a first form of employing the runner assembly apparatus of the invention.

According to FIGS. 1 and 2, the runner assembly 1 consists of a track-forming hollow support frame composed by a pair of frame members 2 and 2' contoured in mirror symmetry, and which guides a chain link belt 3, which in these Figures is only indicated in broken lines.

The two parts 2, 2' of the hollow support are joined together 4, 4' in any convenient manner, such as by way of spacers 5, and by bolts 6, 6'. The flanges 7, facing and directed towards each other, jointly guide the chain link belt 3, which has guide members that extend into the interior of the flanges.

A bow-shaped, U-sectioned load carrier 8 spans the track of the link belt 3 and is attached to the sides of frame members 2, 2' by means of bolts 8'.

As shown in FIGS. 3 to 7 the individual chain links 9 of the link belt 3 are guided between the flanges 7 and engage the interior of the flanges 7 by means of plates 10 of rectangular cross-section. These plates are inserted cross-wise to the running direction of linkbelt 3 and into cutouts 11 provided for this purpose in inwardly extending cheeks 12 of the individual links 9. The plates 10 are retained by the snapping in of an inwardly estending peg 13, which is received in a central notch 14 formed in the plates 10 and which is located between two projections 13' of plate 10. Each individual plate 10 can be removed as needed, by displacing it crosswise. For this purpose a cutout 15 (FIG. 1) is provided in each of the frame members 2 and 2', thus making the end faces of the plates 10 accessible.

The individual links 9 each have recesses 16, within which rolling elements 17 are supported on axles 17'. In the present case the elements 17 are rollers, but may be replaced by balls or the like. The axles 17' traverse not only the link 9, but also the cheeks 18 of the next adjacent link 9 for joining the respective links 9 to form a belt.

By this design of the chain link belt 3, not only is it held captive by the frame members 2 and 2' of the hollow support frame 2 and firmly guided thereby, but it also provides a planar external surface of the individual links 9, and thus is largely insensitive to contamination even when used on rough, muddy or vegetation-covered terrain.

Another considerable advantage results from the fact that all major components of the runner assembly can be made of plastics material, thus minimizing sources of malfunction due to temperature induced elongation or contraction of the support frame or the chain link belt.

Figure 9:
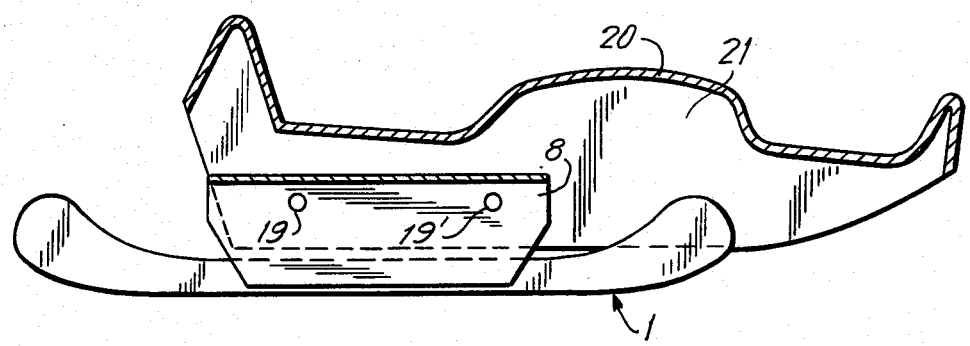

As illustrated in FIGS. 8 and 9, a single runner assembly is attachable by means of cross-bars 19 and 19', to the underside of a load-carrying member 20, to provide a bobsled. The runner assembly is positioned in a downwardly open cavity 21 of the load carrying member 20. In this arrangement, not only does the runner assembly greatly reduce the frictional drag during use on rough terrain, but also controls movement in the longitudinal direction thereof. The runner assembly can be fastened detachably, to permit conversion of the apparatus from winter to summer use, i.e., selective use on snow-covered, ice-covered, or grass-covered terrain.

Figure 10:
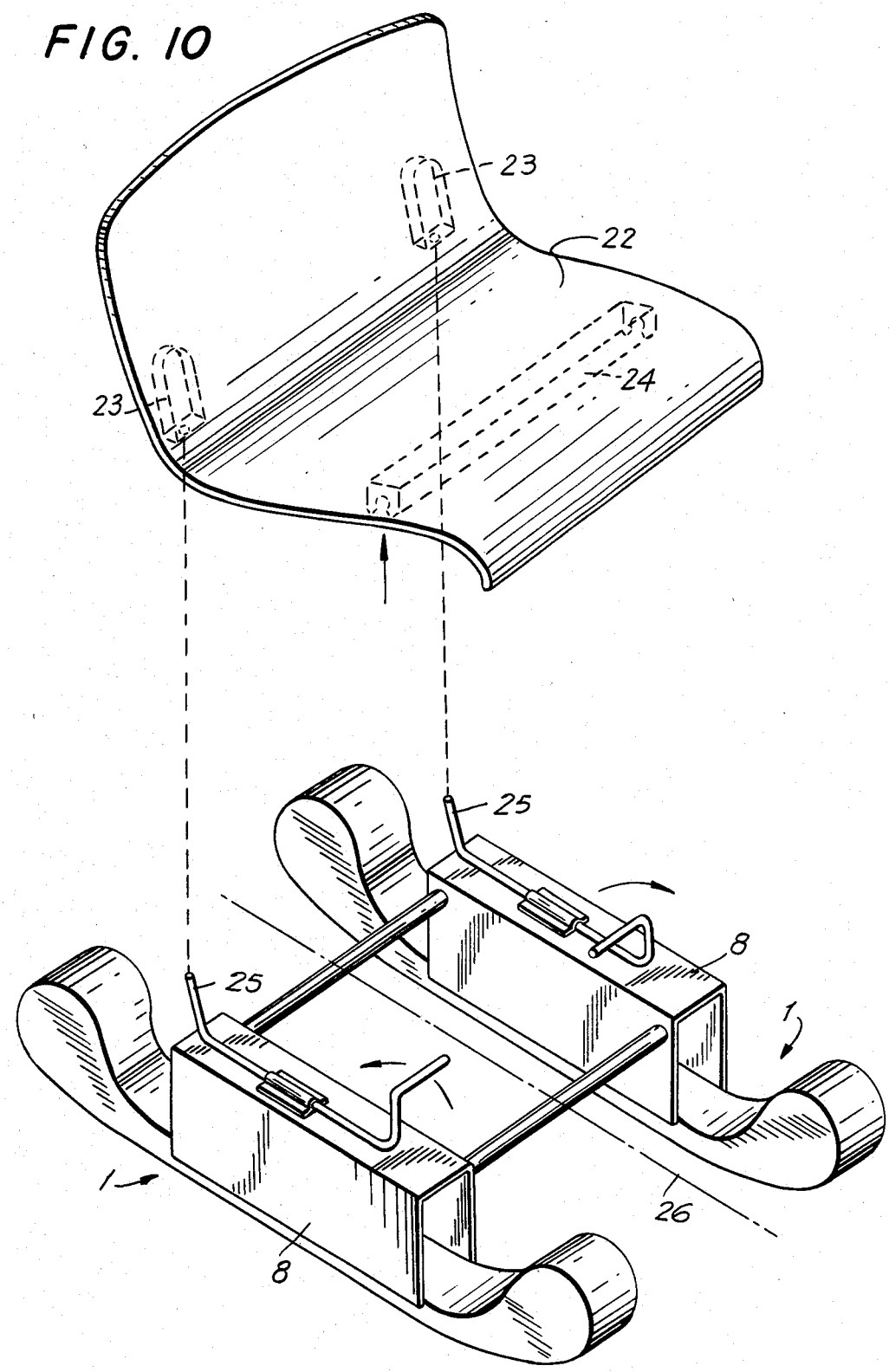
FIG. 10, a second form of apparatus.

In FIG. 10, a pair of parallel runner assemblies carry a seat 22, having sockets 23, 24 for receiving bars 25 displaceably mounted on the runner assemblies. The ends of said bars can be introduced into the sockets 23, 24 in order thus to fasten the seat 22 detachably on the runner assemblies. A pole, which can be used as foot support for the user, and possibly also for hitching the apparatus to a ski lift, can be provided on the axis 26.

Figure 11:
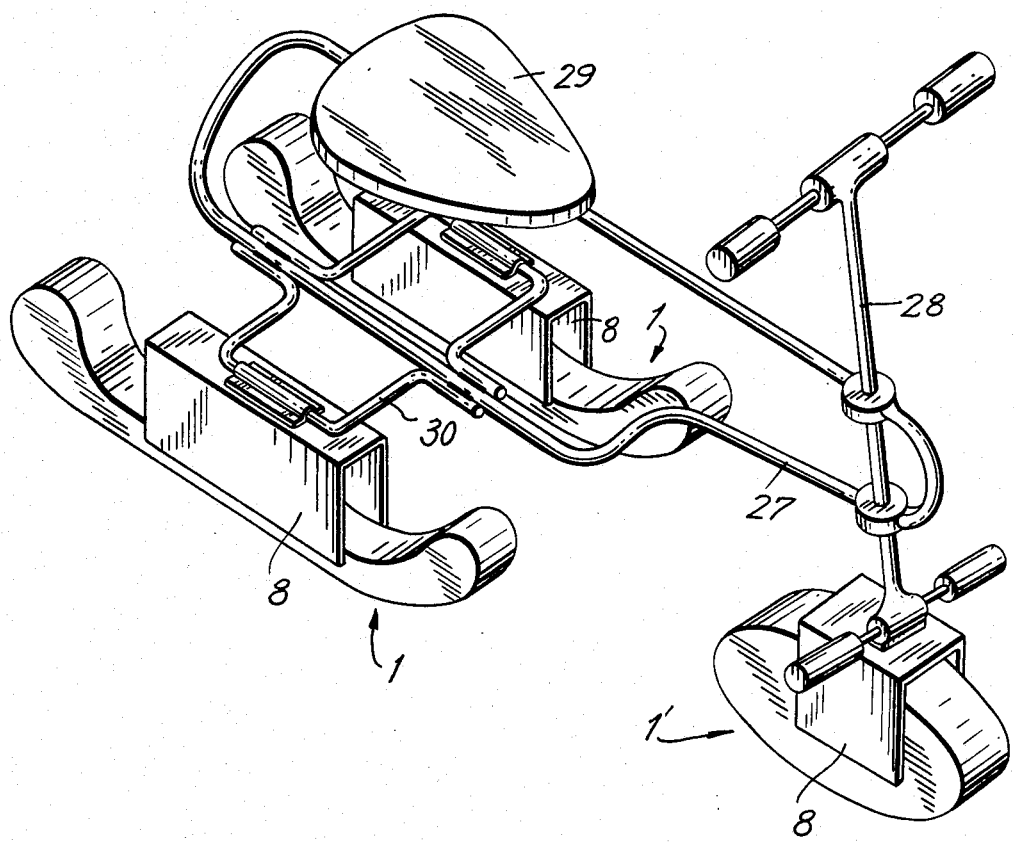
FIG. 11, a third form of apparatus.

According to FIG. 11, a bicycle or skibob type supporting frame 27 is mounted on three runner assemblies 1, 1' according to the invention, the runner assembly 1' carrying a steering column 29. As distinguished from the two runner assemblies 1, the runner assembly 1' is given a convex shape on its upper and lower sides in order to reduce friction.

The frame 27 carrying the seat 29 is connected for swivel articulation with the two runner assemblies 1 by way of brackets 30, in order to enable these runner assemblies to have an individual movement relative to the ground, and to enable the frame 27 to set obliquely to the ground as needed, e.g. when travelling curves or slopes. The connection between the supporting frame 27 and the runner assemblies can be accomplished by means of extension, compression, or torsion springs (not shown), which hold the supporting frame 27 in upright normal position, but permit its movement sideways.

A vehicle according to FIG. 11 can of course be equipped with a skid in front, or, a pair of skids in the rear.

Figure 12:
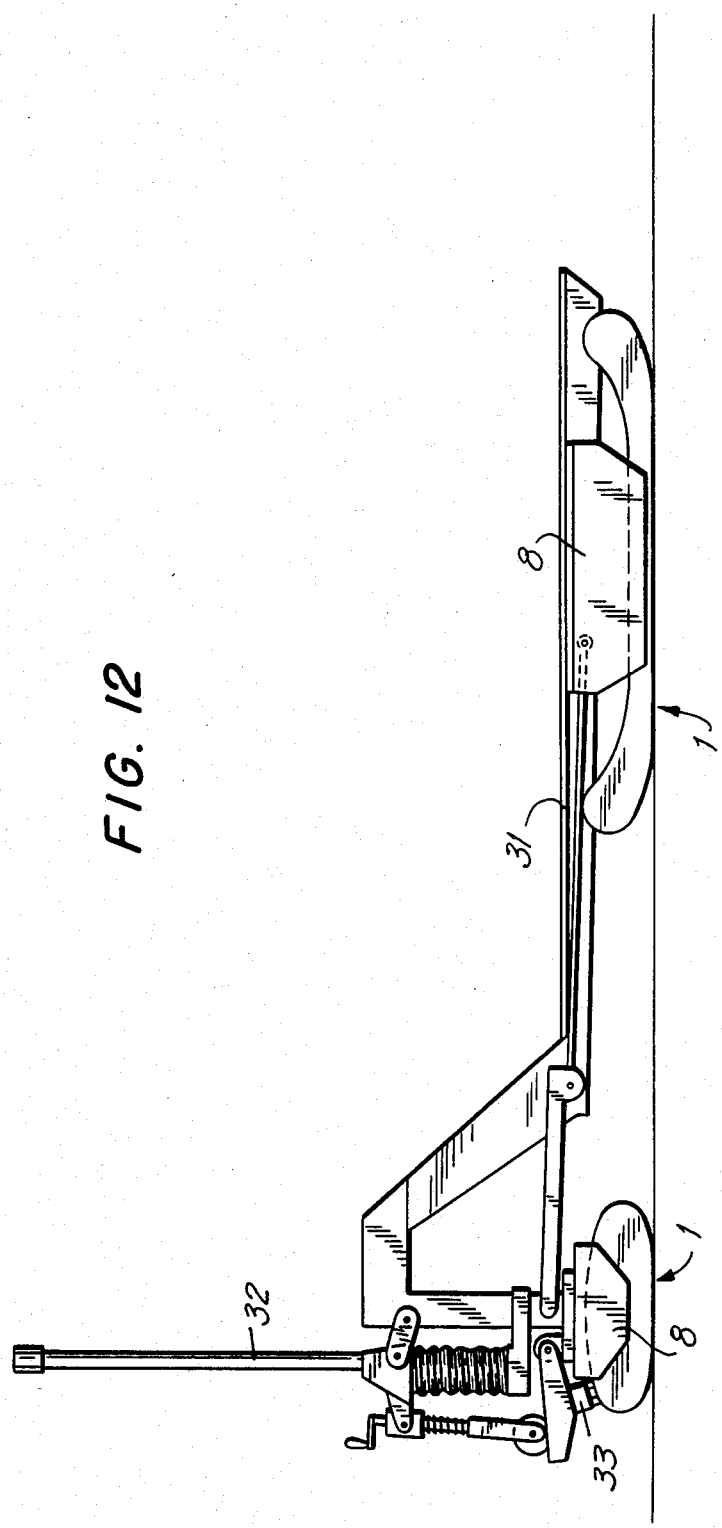
FIGS. 12 and 13 each show a longitudinal view of additional forms of apparatus; and, FIGS. 14 and 15 illustrate in schematic longitudinal views how a runner assembly according to the invention can, if desired, be driven by muscular or motor force.

FIG. 12 shows a load transporter with a support plate 31 which rests on a pair of running assemblies 1 at the rear and is attached on a steerable runner assembly 1' at the front. The pole 32 can be used for steering the vehicle, and also for the hydraulic lifting of the support plate 31, as well as for braking by applying a brake 33 to the top surface of the runner assenbly 1'. Such a brake 33 may consist of a soft rubber plate.

Figure 13:
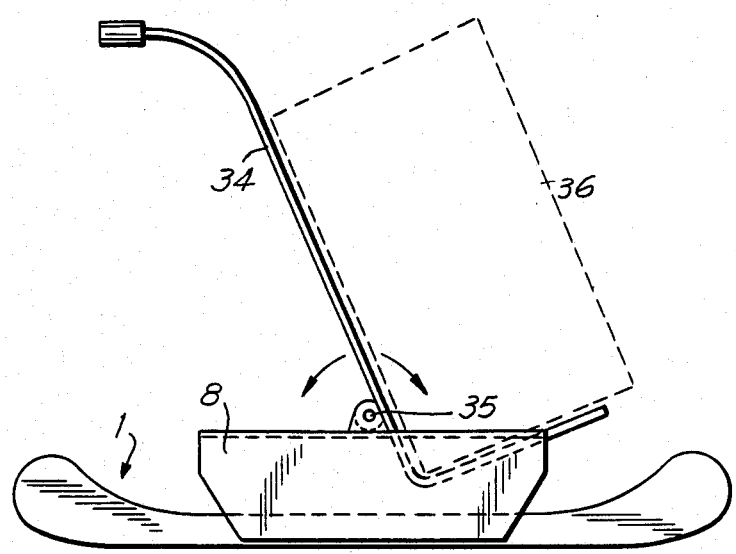

According to FIG. 13, a fork 34 is pivotally suported in bearings 35 on the top side of the load carriers 8. A load 36 can thus be transported without any appreciable requirement of force or skill, even over considerable humps, steps or stairs.

Figure 14:
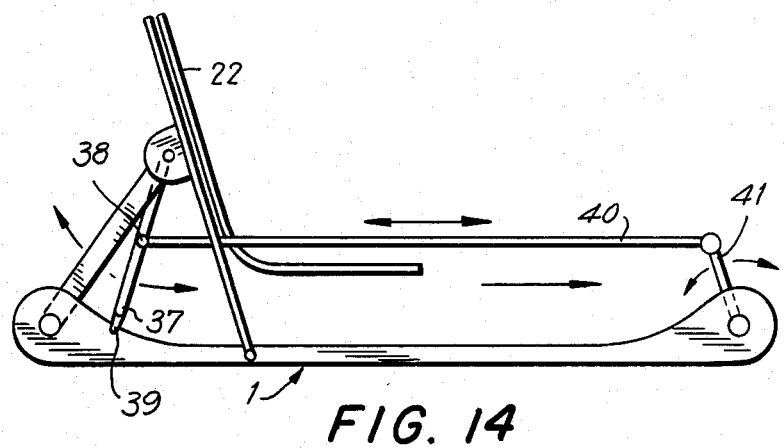

FIGS. 14 and 16 show schematically possibilities for driving runner assemblies according to the invention. These possibilities derive from the fact that the chain link belts is coupled especially firmly with its associated hollow support frame. Thus a drive can come into effective mechanical and positive contact with the outer exposed area of the link belt 3. Conventional track laying chains required a number of drive rollers arranged in the interior of the track laying chain.

According to FIG. 14, such a transmission comprises a lever 37 which acts on an upper section of the chain link belt, and which is pivotably mounted in a bearing connected with a linkage 40 positioned above the chain link belt in a plane parallel thereto. The linkage 40 is articulatedly connected with a pedal lever 41, to which a back-and-forth motion can be imparted by foot drive, and cooperates in the manner of an escapement, engaging by a pawl 39 between the links of the link belt for intermittent advance thereof.

Figure 15:
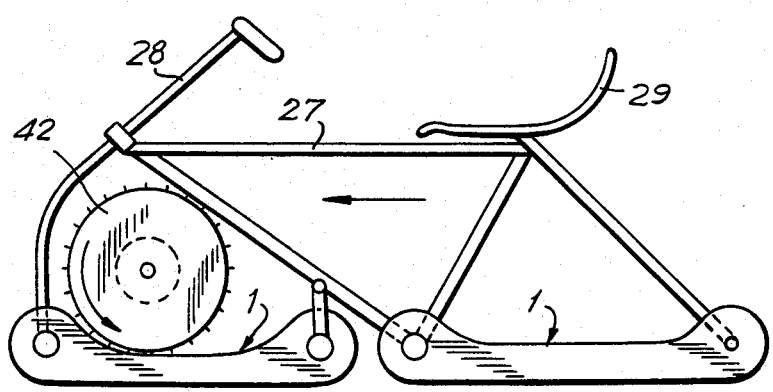

According to FIG. 15, the upper section of the link belt is guided in a circular sector region, and is in positive drive connection with the periphery of a circular pinion.

There are many other possibilities for drive of the chain link belt by muscle force of by motor power, as for instance by the use of a screw of worm pinion cooperating with the link belt. The possibility of steering by differential drive of the individual link belts also exists, as known in itself for track laying vehicles.

I claim:

1. A chain link runner assembly comprised by:
   a frame provided by opposed frame members of mirror image configuration arranged in juxtaposition and joined to each other at least at their peripheral edges, said frame members in combination defining a rigid and hollow support member of substantially closed box cross-section;
   a continuous peripheral flange on each of said frame members, said respective flanges, in transverse cross-section defining opposed channel members for the reception, support and retention of retaining members of links of a chain link belts, and defining spaced guide surfaces for engagement with guide members of said belt;
   said chain link belt including a plurality of link sections each hinged to an adjacent link section at its respective ends;
   anti-friction members interposed between each said link section and an outwardly presented peripheral surface of said flanges;
   guide members fast with each said link member and extending between said spaced guide surfaces; and
   a retaining member fixed within apertures in said guide members and extending transversely of said flanges and laterally beyond said guide surfaces.

2. The chain link runner assembly of claim 1, in which outermost surfaces of each said link section provides a ground engaging surface, and overlaps the ground engaging surface of the next adjacent belt section.

3. The runner assenbly of claim 1, in which said retaining members extend laterally of said guide members, and are removably received within the apertures in said guide members.

4. The runner assembly of claim 3, including a locking member fast with each said link section, and arranged in locking engagement with an associated said retaining member.

5. The chain link runner assembly of claim 3, including an aperture in at least one of said frame members permitting insertion of a said retaining member into a said aperture of said guide member.

6. The runner assembly of claim 1, including a substantially U-shaped support member bridging said chain link belt and rigidly attached to said opposed frame members.

7. The chain link belt runner assembly of claim 1, in combination with a load carrying platform having an inverted U-shaped channel extending longitudinally and centrally thereof, said runner assembly being positioned within said inverted U-shaped channel, and means supporting said load carrying platform spaced above said opposed frame members.

8. The chain link runner assembly of claim 1, in combination with an identical said runner assembly spaced from and extending parallel thereto, and a load carrying member positioned above and supported by said respective runner assemblies.

9. The chain link runner assembly of claim 8, further including drive means engageable with at least one of said chain link belts for moving said belt longitudinally of said opposed channel members.

10. The chain link runner assembly of claim 9, further including drive means engageable with said further runner assembly for moving the chain link belt thereof longitudinally of said opposed channel members thereof.

11. The chain link runner assembly of claim 1, in combination with an identical said runner assembly spaced from and extending parallel thereto, said runner assemblies providing rear support members for a frame of a tricycle, and a further said runner assembly providing a front support member for a steerable column of said tricycle.

* * * * *